United States Patent
Walker et al.

(10) Patent No.: US 10,662,812 B2
(45) Date of Patent: May 26, 2020

(54) LUBRICANT SCOOP

(71) Applicant: UNITED TECHNOLOGIES CORPORATION, Farmington, CT (US)

(72) Inventors: Joseph D. Walker, West Hartford, CT (US); James B. Coffin, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 312 days.

(21) Appl. No.: 15/789,469

(22) Filed: Oct. 20, 2017

(65) Prior Publication Data
US 2019/0120085 A1  Apr. 25, 2019

(51) Int. Cl.
*F01D 25/18* (2006.01)
*F16N 7/32* (2006.01)
*F16C 33/66* (2006.01)
*F16H 57/04* (2010.01)
(Continued)

(52) U.S. Cl.
CPC .......... *F01D 25/18* (2013.01); *F02C 7/06* (2013.01); *F16C 33/66* (2013.01); *F16C 33/6659* (2013.01); *F16H 57/04* (2013.01); *F16H 57/0423* (2013.01); *F16H 57/0456* (2013.01); *F16N 7/16* (2013.01); *F16N 7/32* (2013.01); *F05D 2220/32* (2013.01); *F05D 2240/50* (2013.01); *F05D 2240/60* (2013.01); *F05D 2240/70* (2013.01); *F05D 2260/98* (2013.01); *F16C 2326/43* (2013.01);
(Continued)

(58) Field of Classification Search
CPC ...... F16C 2360/23; F16C 19/06; F01D 25/18; F16N 7/16; F16N 7/32
USPC ........................................................ 184/6.11
See application file for complete search history.

(56) References Cited

U.S. PATENT DOCUMENTS 2,878,894 A * 3/1959 Andrews ................. F16C 19/55
  184/6.9
2,956,824 A  10/1960 Kuchler et al.
(Continued)

FOREIGN PATENT DOCUMENTS

DE  3500955  7/1986
EP  1930613  6/2008
(Continued)

OTHER PUBLICATIONS

European Patent Office, European Search Report dated Feb. 12, 2019 in Application No. 18201047.0.

*Primary Examiner* — Henry Y Liu
(74) *Attorney, Agent, or Firm* — Snell & Wilmer, L.L.P.

(57) ABSTRACT

A lubricant scoop is disclosed. The lubricant scoop includes an annular body configured for engagement with a shaft rotating about a central axis. The annular body includes a first annular portion and a second annular portion disposed adjacent the first annular portion. The first annular portion includes a radially oriented entrance surface and a first axially oriented transition surface. The second annular portion includes a second axially oriented transition surface, a primary redirection member spaced radially outward from the second axially oriented transition surface, a radially oriented exit surface and an exit conduit having an opening positioned on the radially oriented exit surface.

12 Claims, 4 Drawing Sheets

(51) Int. Cl.
*F02C 7/06* (2006.01)
*F16N 7/16* (2006.01)

(52) U.S. Cl.
CPC ...... *F16C 2360/23* (2013.01); *F16N 2210/02* (2013.01); *F16N 2210/14* (2013.01)

(56) References Cited

U.S. PATENT DOCUMENTS

| | | | | |
|---|---|---|---|---|
| 3,195,682 | A * | 7/1965 | Reneerkens | F16H 57/0421 184/11.1 |
| 4,342,489 | A * | 8/1982 | Lenz | F16C 33/6659 184/6.11 |
| 4,648,485 | A * | 3/1987 | Kovaleski | F01D 25/18 184/13.1 |
| 6,409,464 | B1 * | 6/2002 | Fisher | F01D 25/16 384/475 |
| 7,244,096 | B2 * | 7/2007 | Dins | F01D 25/20 415/88 |
| 8,464,835 | B2 * | 6/2013 | Munson | F01D 25/16 184/14 |
| 9,726,040 | B2 * | 8/2017 | Gekht | F16N 7/363 |
| 9,732,630 | B2 * | 8/2017 | Lucas | F01D 25/183 |
| 9,797,268 | B2 * | 10/2017 | Lucas | F01D 17/06 |
| 9,989,083 | B2 * | 6/2018 | Labbe | F01D 11/003 |
| 10,174,629 | B1 * | 1/2019 | Valva | F01D 17/02 |
| 2003/0039421 | A1 * | 2/2003 | Fisher | F01D 25/18 384/462 |
| 2003/0079478 | A1 * | 5/2003 | Romani | F01D 5/081 60/785 |
| 2006/0263202 | A1 * | 11/2006 | Dins | F01D 25/20 415/88 |
| 2010/0038173 | A1 * | 2/2010 | Munson | F01D 25/16 184/6.11 |
| 2014/0369832 | A1 | 12/2014 | Blais et al. | |
| 2016/0281602 | A1 | 9/2016 | Ekht et al. | |

FOREIGN PATENT DOCUMENTS

| | | |
|---|---|---|
| GB | 821346 | 10/1959 |
| GB | 858550 | 1/1961 |
| GB | 922415 | 4/1963 |

* cited by examiner

LUBRICANT SCOOP

FIELD

The present disclosure relates to gas turbine engines and, more particularly, to lubrication delivery systems for rotating componentry within gas turbine engines.

BACKGROUND

Various parts of a gas turbine engine are lubricated using a stream of lubricant fluid. Many such parts, however, are disposed in locations that are difficult to reach. Bearing systems for rotating componentry, such as gas turbine rotors, for example, are often disposed in locations crowded with other componentry. In such cases, lubricant pathways may not be freely selected or routed, leading to ineffective supplies of lubricating fluids where needed. Ineffective supplies of lubricating fluids may result in increased wear and reduced lifetime cycles for bearing systems and related rotating componentry.

SUMMARY

A lubricant scoop is disclosed. In accordance with various embodiments, the lubricant scoop includes an annular body configured for engagement with a shaft rotating about a central axis. The annular body may include a first annular portion and a second annular portion. The first annular portion may have a radially oriented entrance surface and a first axially oriented transition surface. The second annular portion may be disposed adjacent the first annular portion and include a second axially oriented transition surface, a primary redirection member spaced radially outward from the second axially oriented transition surface, a radially oriented exit surface and an exit conduit having an opening positioned proximate the radially oriented exit surface.

In various embodiments, the first annular portion includes a circumferential lubricant inlet defined by a space between the radially oriented entrance surface and the redirection member. The circumferential lubricant inlet may be defined by an annular plane coaxial with and parallel to the central axis. In various embodiments, the first axially oriented transition surface intersects the second axially oriented transition surface at an intersection region where intersecting portions of both surfaces are coaxial with and parallel to the central axis. In various embodiments, the radially oriented entrance surface and the first axially oriented transition surface intersect at a first portion having a first turning surface defined by a first radius of curvature. In various embodiments, the second axially oriented transition surface and the radially oriented exit surface radially oriented exit surface intersect at a second portion having a second turning surface defined by a second radius of curvature. In various embodiments, a radially outermost portion of the radially oriented entrance surface is defined by a radial plane disposed perpendicular to the central axis.

In various embodiments, the primary redirection member is an annular member that extends axially from the second annular portion toward the first annular portion. In various embodiments, the primary redirection member has a proximal end connected to the second annular portion radially outward of the opening to the exit conduit. In various embodiments, the primary redirection member has a distal end that terminates at an axial location coincident with an axially location where the first axially oriented transition surface intersects the second axially oriented transition surface. In various embodiments, the distal end of the primary redirection member includes a secondary redirection member directed radially inward of the primary redirection member.

In accordance with various embodiments, a lubricant scoop is disclosed. In various embodiments, the lubricant scoop includes a first annular body configured for engagement with a shaft rotating about a central axis. The first annular body may include a radially oriented entrance surface and a first axially oriented transition surface. The lubricant scoop may also include a second annular body configured for engagement with the shaft. The second annular body may include a second axially oriented transition surface, a primary redirection member spaced radially outward from the second axially oriented transition surface, a radially oriented exit surface and an exit conduit having an opening positioned on the radially oriented exit surface. In various embodiments, the second annular body is configured for positioning adjacent the first annular body such that the second axially oriented transition surface intersects with the first axially oriented transition surface.

In various embodiments, the primary redirection member is an annular member that extends axially from the second axial body toward the first axial body. The primary redirection member may have a proximal end connected to the second annular body radially outward of the opening to the exit conduit. In various embodiments, the primary redirection member may have a distal end that terminates at an axial location coincident with an axially location where the first axially oriented transition surface intersects the second axially oriented transition surface. In various embodiments, the distal end of the primary redirection member includes a secondary redirection member directed radially inward of the primary redirection member.

In accordance with various embodiments, a gas turbine engine is disclosed. In various embodiments, the gas turbine engine may include a shaft configured to rotate about a central axis and a rotating component configured to rotate with the shaft. To provide lubricant to the rotating component, the gas turbine engine may include a lubricant scoop. In various embodiments, the lubricant scoop may include an annular body engaged with the shaft. The annular body may include a first annular portion having a radially oriented entrance surface and a first axially oriented transition surface. The lubricant scoop may further include a second annular portion adjacent the first annular portion. The second annular portion may have a second axially oriented transition surface, a primary redirection member spaced radially outward from the second axially oriented transition surface, a radially oriented exit surface and an exit conduit having an opening positioned on the radially oriented exit surface. The exit conduit may be configured to communicate lubricant to the rotating component. A lubricant spray nozzle may be directed toward a circumferential lubricant inlet defined by a space between the radially oriented entrance surface and the redirection member.

In various embodiments, the primary redirection member is an annular member that extends axially from the second annular portion toward the first annular portion. In various embodiments, the primary redirection member has a proximal end connected to the second annular portion radially outward of the opening to the exit conduit. In various embodiments, the primary redirection member has a distal end that terminates at an axial location coincident with an axially location where the first axially oriented transition surface intersects the second axially oriented transition surface and wherein the distal end of the primary redirection member includes a secondary redirection member directed radially inward of the primary redirection member.

BRIEF DESCRIPTION OF THE DRAWINGS

The accompanying drawings illustrate various embodiments employing the principles described herein and are a part of the specification. The illustrated embodiments are meant for description and do not limit the scope of the claims.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
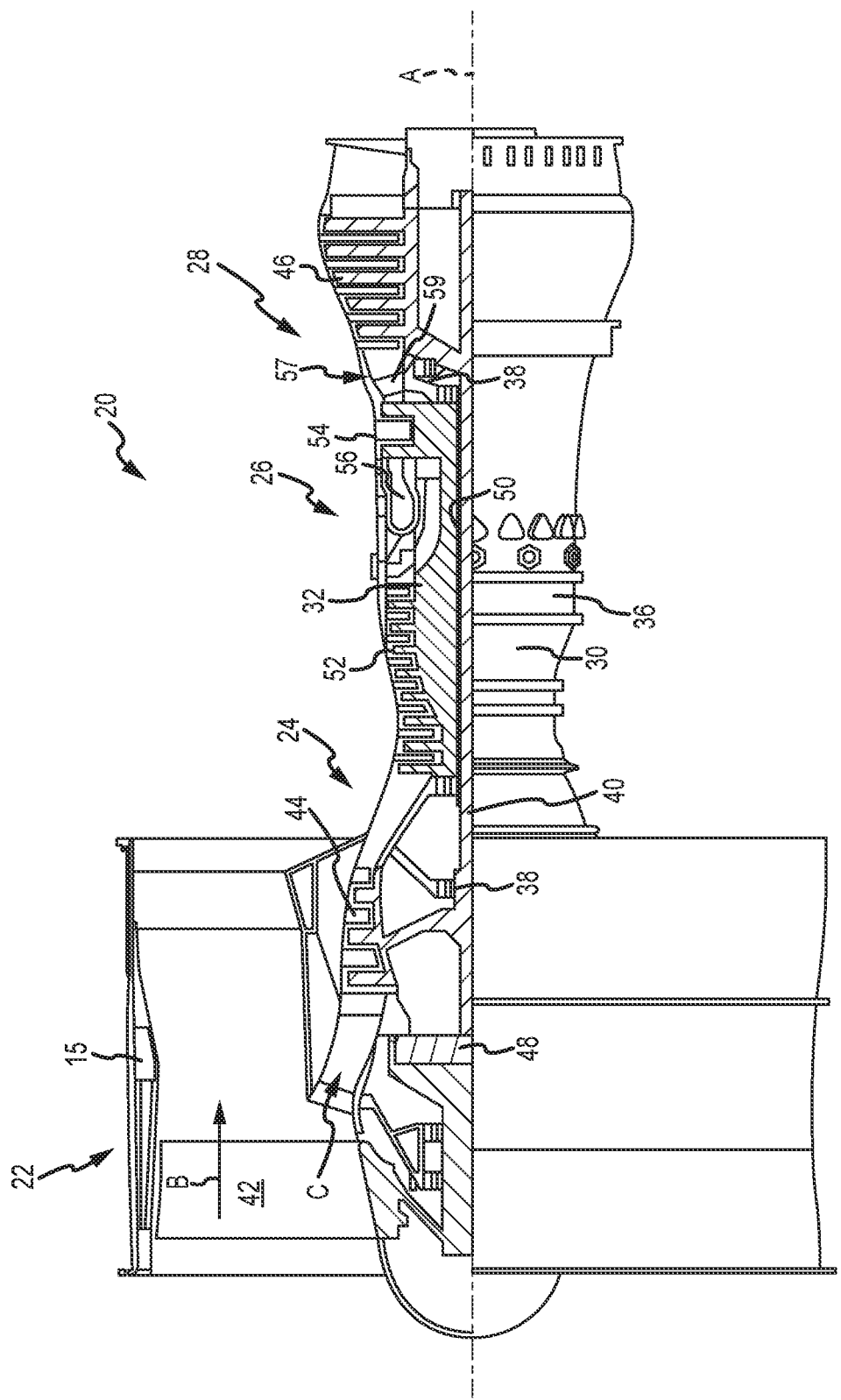
FIG. 1 is a schematic view of a gas turbine engine, in accordance with various embodiments.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core or primary flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of the bearing systems 38 may be varied as appropriate to the application. The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in this gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via the bearing systems 38 about the engine central longitudinal axis A, which is collinear with their longitudinal axes. The bearing systems can be positioned in locations difficult to access for lubrication.

Figure 2:
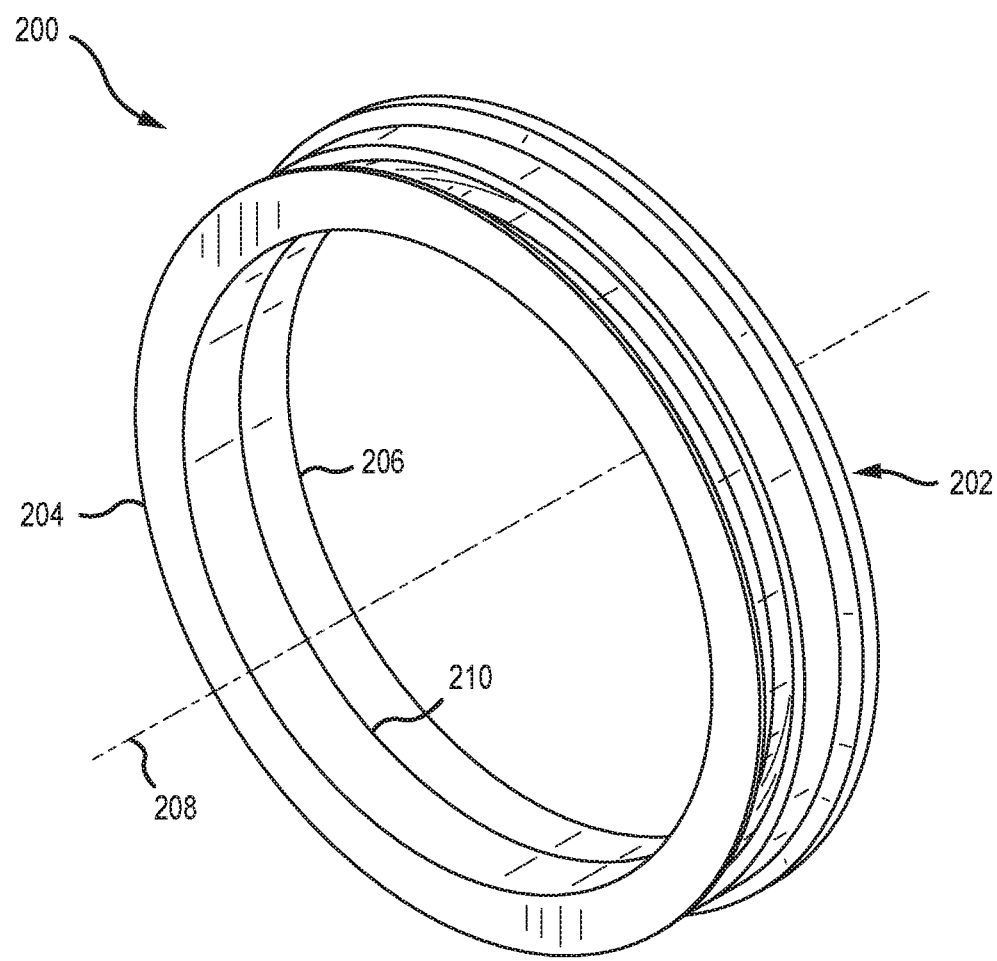
FIG. 2 is a perspective view of a lubricant scoop, in accordance with various embodiments.

Referring now to FIG. 2, a lubricant scoop 200 in accordance with various embodiments is illustrated. The lubricant scoop 200 comprises an annular body 202. In various embodiments, the lubricant scoop 200 may be comprised of a single-component annular body. In various embodiments, the lubricant scoop 200 may be comprised of a multi-component annular body, such as a two-component annular body. In various embodiments, the lubricant scoop 200 comprises an annular body 202, which includes a first annular portion 204 and a second annular portion 206. In various embodiments, the first annular portion 204 and the second annular portion 206 comprise a single-component lubricant scoop. In various embodiments, the first annular portion 204 comprises a first annular body and the second annular portion 206 comprises a second annular body, the first and second annular bodies being separate components that, when positioned adjacent each other, form a two-component lubricant scoop. In various embodiments, the first annular portion 204 and the second annular portion 206 join together at a surface 210 extending radially through the lubricant scoop 200. A central axis 208 may run through the axial center of the lubricant scoop 200.

Figure 3:
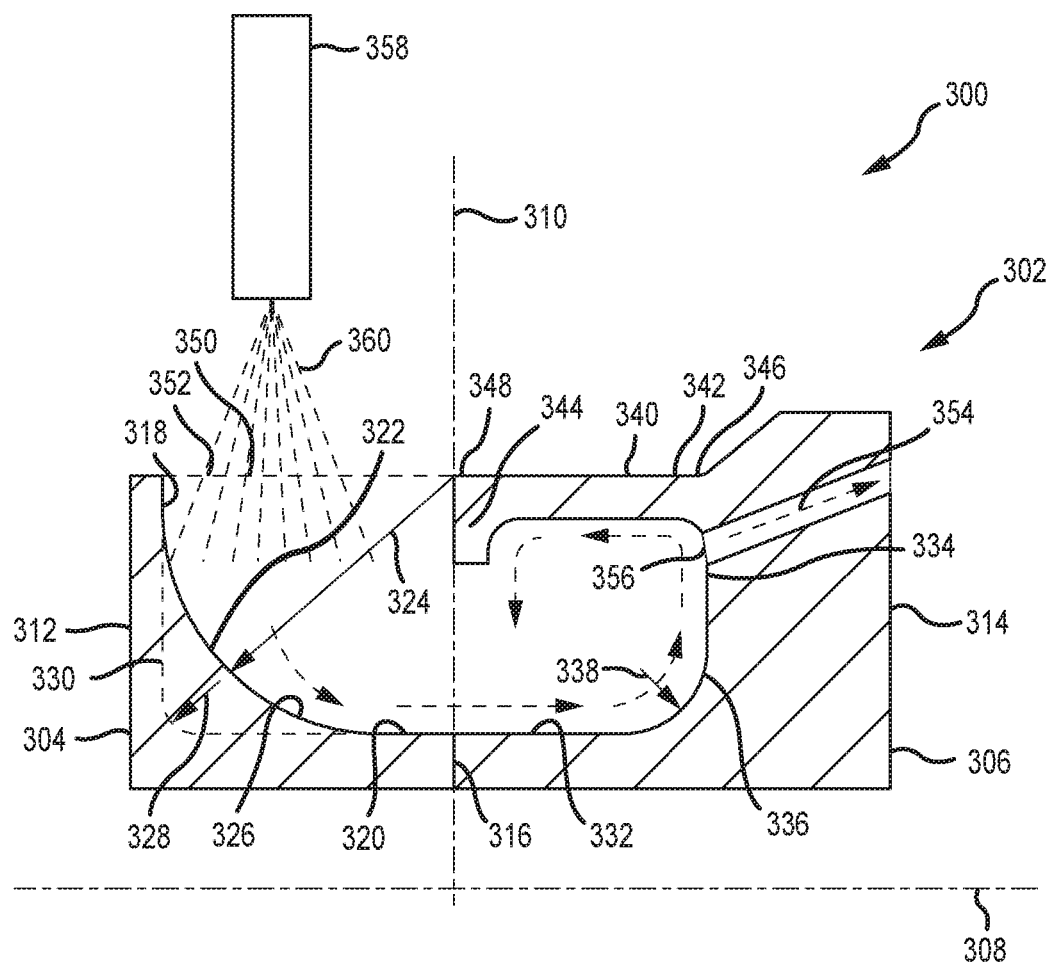
FIG. 3 is a cross sectional view of a lubricant scoop, in accordance with various embodiments.

Referring now to FIG. 3, a cross section of a lubricant scoop 300 is illustrated in accordance with various embodiments. Similar to the embodiment described above with reference to FIG. 2, the lubricant scoop 300 comprises an annular body 302. In various embodiments, the annular body 302 comprises a first annular portion 304 and a second annular portion 306. In various embodiments, the first annular portion 304 and the second annular portion 306 comprise a single-component lubricant scoop. In various embodiments, the first annular portion 304 comprises a first annular body and the second annular portion 306 comprises a second annular body, the first and second annular bodies being separate components that, when positioned adjacent each other, form a two-component lubricant scoop. A central axis 308 may run through an axial center of the lubricant scoop 300. In various embodiments, a radial plane 310 separates the annular body 302 into the first annular portion 304 and the second annular portion 306. In various embodiments, the radial plane 310 may also define an interface 316 between a first annular body 312 and a second annular body 314. In the description that follows, the same principles apply to embodiments having a single-component annular body, which may include the first annular portion 304 and the second annular portion 306, and to embodiments having a multi-component annular body, which may include the first annular body 312 disposed adjacent the second annular body 314.

In various embodiments, the first annular portion 304 may include a radially oriented entrance surface 318 and a first axially oriented transition surface 320. In various embodiments, the radially oriented entrance surface 318 includes a surface portion toward the radially outermost portion that is substantially radial with respect to the central axis 308—i.e., a portion of the radially oriented entrance surface 318 at the radially outermost portion of the surface is substantially perpendicular to the central axis 308. In various embodiments, the first oriented transition surface 320 includes a portion toward the interface 316 or radial plane 310 that is substantially axial with respect to the central axis 308—i.e., a portion of the first axially oriented transition surface 320 closest the radial plane 310 is substantially parallel to the central axis 308.

In various embodiments, the radially oriented entrance surface 318 and the first axially oriented transition surface 320 intersect at a first turning surface 326 defined by a radius of curvature 324. In various embodiments, the radius of curvature 324 and its radial origin may be selected to provide a surface 322 in the shape of a quarter-circle that provides a smooth and continuous transition from a radial direction at the radially oriented entrance surface 318 to an axial direction at the first axially oriented transition surface 320. In various embodiments, a radius of curvature 328 and its radial origin may be selected to provide a surface 330 in the shape approaching a quarter-square that provides a sudden and abrupt transition from a radial direction at the radially oriented entrance surface 318 to an axial direction at the first axially oriented transition surface 320. In the latter embodiments, the radius of curvature 328 has a value selected relatively small in comparison to a value for the radius of curvature 324 selected for the former embodiments.

Still referring to FIG. 3, the second annular portion 306 may include a second axially oriented transition surface 332 and a radially oriented exit surface 334. In various embodiments, the second axially oriented transition surface 332 is sized and configured to mate smoothly with the first axially oriented transition surface 320. In various embodiments, the first axially oriented transition surface 320 intersects the second axially oriented transition surface 332 at an intersection region where intersecting portions of both surfaces are coaxial with and parallel to the central axis 308, providing a smooth annular transition surface for fluid flow from the first annular portion 304 to the second annular portion 306. In various embodiments, the radially oriented exit surface 334 includes a surface portion toward a radially outermost portion that is substantially radial with respect to the central axis 308—i.e., a portion of the radially oriented exit surface 334 at the radially outermost portion of the surface is substantially perpendicular to the central axis 308. In various embodiments, the second axially oriented transition surface 332 includes a portion toward the interface 316 or radial plane 310 that is substantially axial with respect to the central axis 308—i.e., a portion of the second axially oriented transition surface 332 closest the radial plane 310 is substantially parallel to the central axis 308.

In various embodiments, the radially oriented exit surface 334 and the second axially oriented transition surface 332 intersect at a second turning surface 336 defined by a radius of curvature 338. Similar to the discussion above regarding the first annular portion 304, in various embodiments, the second turning surface 336 may be selected to provide a surface in the shape of a quarter-circle that provides a smooth and continuous transition from an axial direction at the second axially oriented transition surface 332 to a radial direction at the radially oriented exit surface 334. In various embodiments, the radius of curvature 338 and its radial origin may be selected to provide a surface in a shape approaching a quarter-square that provides a sudden and abrupt transition from an axial direction at the second axially oriented transition surface 332 to a radial direction at the radially oriented exit surface 334.

Still referring to FIG. 3, the second annular portion 306 may include a redirection member 340. In various embodiments, the redirection member 340 includes a primary redirection member 342 and a secondary redirection member 344. The redirection member 340 may extend in an axial direction from a proximal end 346 connected to the second annular portion 306 proximate the radially oriented exit surface 334 to a distal end 348. In various embodiments, the primary redirection member 342 includes the distal end 348 and terminates at an axial location coincident with an axially location where the first axially oriented transition surface 320 intersects or joins the second axially oriented transition surface 332. In various embodiments, the primary redirection member 342 including the distal end 348, terminates at the radial plane 310 discussed above, which may be positioned at the same axial location where the first axially oriented transition surface 320 intersects or joins the second axially oriented transition surface 332. In various embodiments, the secondary redirection member 344 is positioned at the distal end 348 and extends radially inward of the primary redirection member 342.

Still referring to FIG. 3, the lubricant scoop 300 includes a circumferential lubricant inlet 350. In various embodiments, the circumferential lubricant inlet 350 is defined by a space or opening existing between the radially oriented entrance surface 318 and the distal end 348 of the redirection member 340. In various embodiments, the circumferential lubricant inlet 350 is defined by an inlet opening 352 existing between the radially oriented entrance surface 318 and the distal end 348 of the redirection member 340 wherein the inlet opening 352 defines an annular plane that is coaxial with and parallel to the central axis 308. The lubricant scoop 300 may also include an exit conduit 354. In various embodiments, the exit conduit 354 includes an opening 356 positioned at an intersection of the proximal end 346 of the redirection member 340 and the radially oriented exit surface 334. The exit conduit 354 provides a passageway for lubrication fluid to flow from the lubricant scoop 300 to a rotating component. In various embodiments, a plurality of exit conduits 354 is spaced circumferentially about the lubricant scoop 300.

In operation, as will be discussed further below, a nozzle 358 directs a stream of lubricant 360 toward the circumferential lubricant inlet 350 or inlet opening 352 in a generally radial direction with respect to the central axis 308. The stream of lubricant 360 is turned from a generally radial direction to a generally axial direction by the radially oriented entrance surface 318 of the first annular portion 304, followed by the first turning surface 326, which transfers the lubricant to the first axially oriented transition surface 320. Following passage from the first annular portion 304 to the second annular portion 306, via the first axially oriented transition surface 320 of the first annular portion 304 to the second axially oriented transition surface 332 of the second annular portion 306, the stream of lubricant 360 is turned from a generally axial direction to a generally radial direction by the second turning surface 336 toward the radially oriented exit surface 334. As the lubrication fluid approaches the redirection member 340, a portion of the fluid enters the exit conduit 354 for transport to a rotating component. The remaining portion of the lubrication fluid, if any, is redirected axially in a reverse direction—i.e., back toward the first annular portion 304, where it is retained by centrifugal force. In various embodiments, the primary redirection member 342 directs the lubrication fluid in the reverse axial direction and the secondary redirection member 344 may direct the lubrication fluid radially inward to mix with incoming flow. In various embodiments, centrifugal force imparted to the fluid as it is directed along the radially oriented exit surface 334 as the lubricant scoop 300 rotates about the central axis 308 creates a pressure differential sufficient to force the lubrication fluid through the exit conduit 354 and into rotating componentry connected to the exit conduit 354. In various embodiments, the redirection member 340 retains lubricant proximate the exit conduit 354 due to centrifugal force imparted on the fluid as the lubricant scoop 300 rotates. In various embodiments, establishment and maintenance of fluid pressure proximate the opening 356 to the exit conduit 354 is a primary function of the redirection member 340, while radially inward redirection of lubricant is a secondary function.

Figure 4:
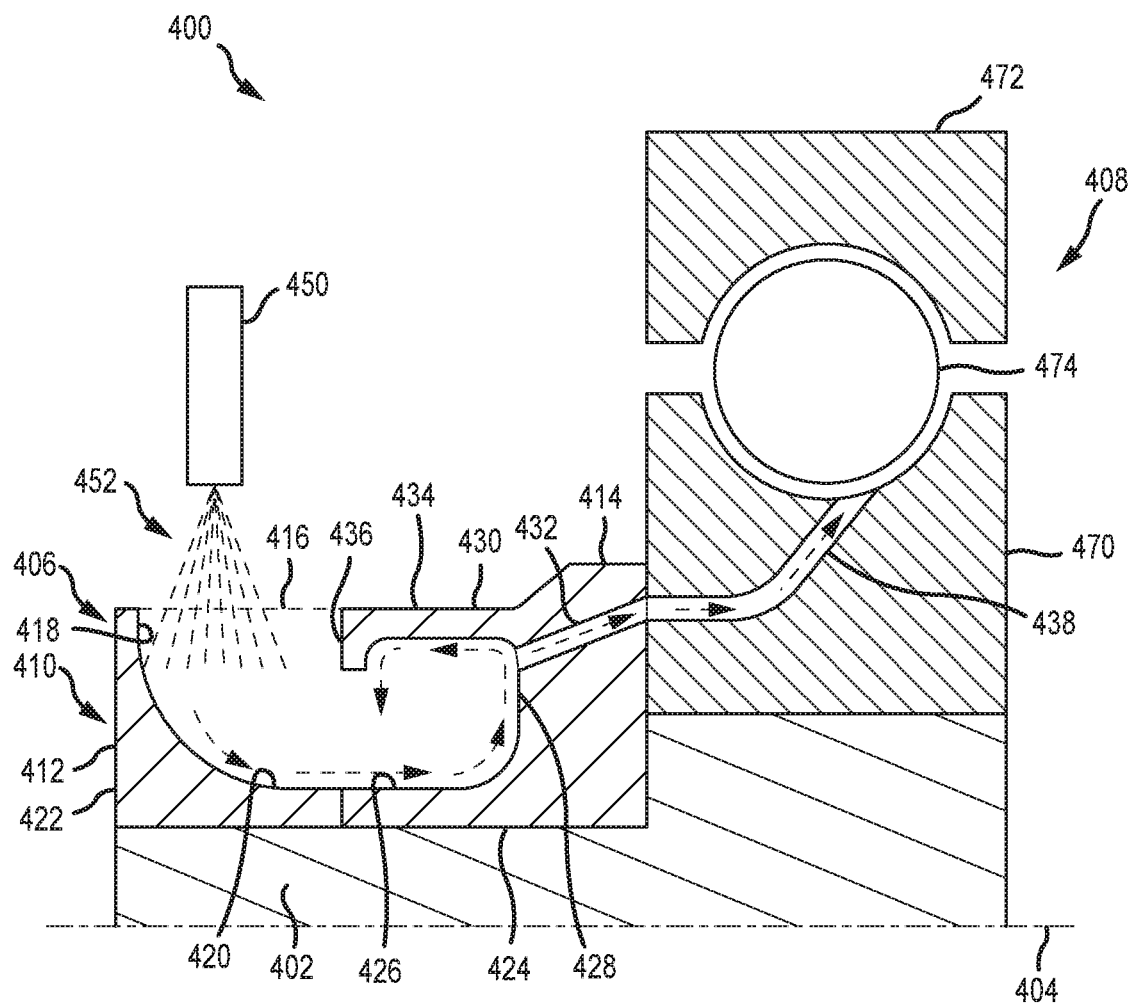
FIG. 4 is a cross sectional view of a lubricant scoop and associated rotating component, in accordance with various embodiments.

Referring now to FIG. 4, a sectional view of a lubrication system 400, comprising a rotating component and a lubricant scoop, such as found within the gas turbine engine illustrated in FIG. 1, is provided. The lubrication system 400 includes an axle 402 configured to rotate about a central axis 404. A lubricant scoop 406 is rotationally disposed on the axle 402 together with a bearing assembly 408. A lubricant nozzle 450 provides a stream of lubricant 452 toward the lubricant scoop 406 for transport to rotating componentry, such as the bearing assembly 408.

In various embodiments, the lubricant scoop 406 comprises an annular body 410. In various embodiments, the annular body 410 comprises a first annular body 412 and a second annular body 414. In various embodiments, the first annular body 412 is an integral component separate and apart from the second annular body 414, which is also an integral component separate and apart from the first annular body 412. As described above, the same principles apply in this disclosure to embodiments having a single annular body and to embodiments having a multi-component annular body. In various embodiments, the bearing assembly 408 has an inner race 470 connected to and configured to rotate with the axle 402 and an outer race 472 connected to a non-rotating portion of the gas turbine engine, such that the inner race 470 rotates relative to the outer race 472. A rolling or sliding element, such as a ball bearing 474, is disposed between the inner race 470 and the outer race 472. In the description that follows, the same principles of operation and construction provided above apply with reference to FIG. 4.

In operation, and in accordance with various embodiments, the nozzle 450 directs the stream of lubricant 452 toward a circumferential lubricant inlet 416 in a generally radial direction with respect to the central axis 404. The stream of lubricant 452 is turned from a generally radial direction to a generally axial direction by a radially oriented entrance surface 418 followed by a first axially oriented transition surface 420. Following passage from the first annular body 412 (or a first annular portion 422) to the second annular body 414 (or a second annular portion 424), the stream of lubricant 452 is turned from a generally axial direction to a generally radial direction by a second axially oriented transition surface 426 followed by a radially oriented exit surface 428. As the lubrication fluid approaches a redirection member 430, a portion of the fluid enters an exit conduit 432 for transport to a rotating component, such as the bearing assembly 408. The remaining portion of the lubrication fluid, if any, is directed axially in a reverse direction—i.e., back toward the first annular body or first annular portion—and then radially inward. In various embodiments, a primary redirection member 434 directs the lubrication fluid in the reverse axial direction and a secondary redirection 436 member directs the lubrication fluid radially inward to mix with incoming flow.

In various embodiments, centrifugal force imparted to the fluid as it is directed along the radially oriented exit surface 428 as the lubricant scoop 406 rotates about the central axis 404 creates a pressure differential sufficient to force the lubrication fluid through the exit conduit 432 and into rotating componentry connected to the exit conduit 432, such as the bearing assembly 408. In various embodiments, the exit conduit 432 interfaces with a delivery conduit 438 disposed within the inner race 470 of the bearing assembly 408. The delivery conduit 438 routes lubrication fluid from the exit conduit 432 to the ball bearing 474, providing lubrication to the bearing assembly 408.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching. Those skilled in the art will appreciate, for example, the above disclosure provides a method for enhancing the targeting of lubrication fluid in the confines of a crowded compartment. The disclosure also provides a designer with configuration choices, such a single-piece lubrication scoop or a multiple-piece (e.g., a two-piece) lubrication scoop. The former configuration provides for reduced part count. The latter configuration—e.g., the two-piece configuration discussed above—may provide for improved manufacturability and reduced cost. Either configuration may provide for simplified assembly and disassembly of the oil scoop and engine, as well as simplified assembly tooling and design.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A lubricant scoop, comprising:
an annular body configured for engagement with a shaft rotating about a central axis, the annular body including
a first annular portion having a radially oriented entrance surface and a first axially oriented transition surface and
a second annular portion disposed adjacent the first annular portion and having a second axially oriented transition surface, a primary redirection member spaced radially outward from the second axially oriented transition surface, a radially oriented exit surface and an exit conduit having an opening positioned proximate the radially oriented exit surface,
wherein the primary redirection member is an annular member that extends axially from the second annular portion toward the first annular portion,
wherein the primary redirection member has a proximal end connected to the second annular portion radially outward of the opening to the exit conduit and
wherein the primary redirection member has a distal end that terminates at an axial location coincident with an axially location where the first axially oriented transition surface intersects the second axially oriented transition surface.

2. The lubricant scoop of claim 1, wherein the first annular portion includes a circumferential lubricant inlet defined by a space between the radially oriented entrance surface and the primary redirection member.

3. The lubricant scoop of claim 2, wherein the circumferential lubricant inlet is defined by an annular plane coaxial with and parallel to the central axis.

4. The lubricant scoop of claim 1, wherein the first axially oriented transition surface intersects the second axially oriented transition surface at an intersection region where intersecting portions of both surfaces are coaxial with and parallel to the central axis.

5. The lubricant scoop of claim 1, wherein the radially oriented entrance surface and the first axially oriented transition surface intersect at a first portion having a first turning surface defined by a first radius of curvature.

6. The lubricant scoop of claim 1, wherein the second axially oriented transition surface and the radially oriented exit surface intersect at a second portion having a second turning surface defined by a second radius of curvature.

7. The lubricant scoop of claim 1, wherein a radially outermost portion of the radially oriented entrance surface is defined by a radial plane disposed perpendicular to the central axis.

8. The lubricant scoop of claim 1, wherein the distal end of the primary redirection member includes a secondary redirection member directed radially inward of the primary redirection member.

9. A lubricant scoop, comprising:
a first annular body configured for engagement with a shaft rotating about a central axis, the first annular body including a radially oriented entrance surface and a first axially oriented transition surface and
a second annular body configured for engagement with the shaft, the second annular body comprising a second axially oriented transition surface, a primary redirection member spaced radially outward from the second axially oriented transition surface, a radially oriented exit surface and an exit conduit having an opening positioned on the radially oriented exit surface,
wherein the second annular body is configured for positioning adjacent the first annular body such that the second axially oriented transition surface intersects with the first axially oriented transition surface,
wherein the primary redirection member is an annular member that extends axially from the second annular body toward the first annular body,
wherein the primary redirection member has a proximal end connected to the second annular body radially outward of the opening to the exit conduit and
wherein the primary redirection member has a distal end that terminates at an axial location coincident with an axially location where the first axially oriented transition surface intersects the second axially oriented transition surface.

10. The lubricant scoop of claim 9, wherein the distal end of the primary redirection member includes a secondary redirection member directed radially inward of the primary redirection member.

11. A gas turbine engine, comprising:
a shaft configured to rotate about a central axis;
a rotating component configured to rotate with the shaft;
a lubricant scoop, comprising:
an annular body engaged with the shaft, the annular body including
a first annular portion having a radially oriented entrance surface and a first axially oriented transition surface and
a second annular portion adjacent the first annular portion and having a second axially oriented transition surface, a primary redirection member spaced radially outward from the second axially oriented transition surface, a radially oriented exit surface and an exit conduit having an opening positioned on the radially oriented exit surface, wherein the exit conduit is configured to communicate lubricant to the rotating component; and a lubricant spray nozzle directed toward a circumferential lubricant inlet defined by a space between the radially oriented entrance surface and the primary redirection member, wherein the primary redirection member is an annular member that extends axially from the second annular portion toward the first annular portion, wherein the primary redirection member has a proximal end connected to the second annular portion radially outward of the opening to the exit conduit and wherein the primary redirection member has a distal end that terminates at an axial location coincident with an axially location where the first axially oriented transition surface intersects the second axially oriented transition surface.

12. The gas turbine engine of claim 11, wherein the distal end of the primary redirection member includes a secondary redirection member directed radially inward of the primary redirection member.

* * * * *